(12) United States Patent
Brunet

(10) Patent No.: US 8,424,905 B2
(45) Date of Patent: Apr. 23, 2013

(54) INTERIOR TRIM ASSEMBLY FOR A MOTOR VEHICLE AND MOTOR VEHICLE

(75) Inventor: Michael Brunet, Therdonne (FR)

(73) Assignee: Faurecia Interieur Industrie, Nanterre (FR)

( * ) Notice: Subject to any disclaimer, the term of this patent is extended or adjusted under 35 U.S.C. 154(b) by 75 days.

(21) Appl. No.: 13/122,551

(22) PCT Filed: Oct. 2, 2008

(86) PCT No.: PCT/FR2008/051784
§ 371 (c)(1),
(2), (4) Date: Apr. 15, 2011

(87) PCT Pub. No.: WO2010/037915
PCT Pub. Date: Apr. 8, 2010

(65) Prior Publication Data
US 2011/0181028 A1    Jul. 28, 2011

(51) Int. Cl.
*B60R 21/20* (2006.01)
(52) U.S. Cl.
USPC ..................................................... 280/728.3
(58) Field of Classification Search ............... 280/728.3
See application file for complete search history.

(56) References Cited

U.S. PATENT DOCUMENTS

| | | | |
|---|---|---|---|
| 6,152,569 A | 11/2000 | Aizawa | |
| 6,644,685 B2 * | 11/2003 | Sun et al. | 280/728.3 |
| 6,890,089 B2 | 5/2005 | Haering et al. | |
| 7,284,886 B2 | 10/2007 | Chen et al. | |
| 7,293,899 B2 | 11/2007 | Boyd et al. | |
| 7,350,951 B2 | 4/2008 | Sakai et al. | |
| 7,370,987 B2 | 5/2008 | De Zwart et al. | |
| 7,370,995 B2 | 5/2008 | Hein et al. | |
| 8,177,255 B2 * | 5/2012 | Le Hoang et al. | 280/728.3 |
| 8,191,924 B2 * | 6/2012 | Schupbach | 280/728.3 |

(Continued)

FOREIGN PATENT DOCUMENTS

| | | |
|---|---|---|
| DE | 4315853 A1 * | 11/1994 |
| DE | 101 29953 A1 | 1/2003 |

(Continued)

OTHER PUBLICATIONS

International Search Report dated Jul. 2, 2009, for International Application No. PCT/FR2008/051784.

*Primary Examiner* — Faye M. Fleming
(74) *Attorney, Agent, or Firm* — Knobbe Martens Olson & Bear LLP

(57) ABSTRACT

The interior trim assembly for a motor vehicle is of the type comprising a framework and a panel for concealing an airbag comprising a flap a peripheral region surrounding the flap and attached to the framework, a hinge-forming strip having a flap portion attached to the flap, a framework portion attached to the framework, and a hinge portion extending between the flap portion and the framework portion. The region of the hinge portion adjacent to the framework portion may be covered by a protecting element and the region of the hinge portion adjacent to the flap region is exposed.

15 Claims, 6 Drawing Sheets

U.S. PATENT DOCUMENTS

| | | |
|---|---|---|
| 2003/0223217 A1 | 12/2003 | Wright et al. |
| 2004/0119267 A1* | 6/2004 | Cowelchuck et al. ..... 280/728.3 |
| 2004/0232668 A1 | 11/2004 | DePue et al. |
| 2005/0116453 A1* | 6/2005 | Geum ........................... 280/732 |
| 2005/0127641 A1* | 6/2005 | Cowelchuk et al. ....... 280/728.3 |
| 2005/0280524 A1 | 12/2005 | Boone et al. |
| 2006/0279959 A1 | 12/2006 | Yabashi et al. |
| 2007/0008739 A1 | 1/2007 | Kim et al. |
| 2007/0052211 A1* | 3/2007 | Hayashi ..................... 280/728.3 |
| 2008/0080211 A1 | 4/2008 | Chuang et al. |
| 2008/0205035 A1 | 8/2008 | Asvadi et al. |
| 2011/0084469 A1* | 4/2011 | Wittkamp ................... 280/728.3 |
| 2011/0278827 A1* | 11/2011 | Laboeck et al. ............ 280/743.2 |
| 2012/0126514 A1* | 5/2012 | Choi .......................... 280/728.3 |

FOREIGN PATENT DOCUMENTS

| | | |
|---|---|---|
| DE | 103 61 581 A1 | 7/2005 |
| DE | 10 2006 017960 A1 | 10/2007 |
| EP | 0650010 A1 | 4/1995 |
| EP | 0813026 A2 | 12/1997 |
| EP | 2 050 628 A1 | 4/2009 |
| FR | 2 877 896 A1 | 5/2006 |
| FR | 2902727 A | 12/2007 |
| JP | 07-285406 A | 10/1995 |
| WO | WO 02/47943 A | 6/2002 |
| WO | WO 2008/016160 A1 | 2/2008 |
| WO | WO 2009/062755 A | 5/2009 |

* cited by examiner

US 8,424,905 B2

INTERIOR TRIM ASSEMBLY FOR A MOTOR VEHICLE AND MOTOR VEHICLE

RELATED APPLICATIONS

This application is a U.S. National Phase of International Application No.: PCT/FR2008/051784, filed Oct. 2, 2008, designating the U.S., and published in French as WO 2010/037915 on Apr. 8, 2010.

FIELD OF THE INVENTION

The present invention relates to an interior trim assembly for a motor vehicle comprising a framework and a panel for concealing an airbag, the panel being fastened on the framework and comprising a flap covering an airbag deployment passage delimited by the framework and a peripheral region surrounding the flap and attached to the framework, the flap being intended to move during the deployment of the airbag to free the passage, the panel comprising a hinge-forming strip having a flap portion attached to the flap, a framework portion attached to the framework, and a hinge portion extending between the flap portion and the framework portion.

BACKGROUND OF THE INVENTION

When the airbag is inflated, the airbag moves the flap to pass through the panel. The hinge-forming strip allows the flap to pivot relative to the peripheral region, and retains the flap to prevent it from being projected into the passenger cab and injuring an occupant.

US 2004/232668 describes an interior trim assembly of the aforementioned type, wherein the strip is reinforced while being completely overmolded by plastic material.

SUMMARY OF THE INVENTION

One aim of the invention is to propose an interior trim assembly for a motor vehicle allowing safer retention of the flap by the strip.

To that end, the invention proposes an interior trim assembly of the aforementioned type, wherein the region of the hinge portion adjacent to the framework portion is covered by a protecting element and the region of the hinge portion adjacent to the flap region is exposed.

According to other embodiments, the interior trim assembly comprises one or more of the following features, considered alone or according to all technically possible combinations:

- the covered region represents the majority of the hinge portion length between the flap portion and the framework portion;
- a reinforcing element is overmolded on the flap portion;
- the flap portion is attached on the flap by welding of the reinforcing element covering the flap portion;
- a reinforcing element is overmolded on the framework portion;
- the protecting element is overmolded on the hinge portion while being integral with the reinforcing element covering the framework portion;
- the reinforcing element covering the framework portion is generally in plate form, and the protective element is in the form of a lip protruding from one edge of the reinforcing element covering the framework portion, the lip forming an angle with the reinforcing element covering the framework portion;
- the assembly comprises a deflector arranged to partially obstruct a passage upstream of the strip in the direction of deployment of the airbag, the deflector being integral with the reinforcing element covering the framework portion;
- the deflector is provided to fold down against the intermediate portion of the strip;
- the deflector comprises a central portion extending through the passage and two lateral extensions attached on the framework and separated from the central portion by at least one breaking line intended to tear so the central portion folds down against the intermediate portion;
- the strip is a knit strip or a net;
- the panel comprises a breaking line delimiting the flap, and intended to tear to allow the flap to move relative to the peripheral region in order to free the passage; and
- the assembly comprises a case receiving the folded airbag, the case being attached on the framework on the side opposite the panel, the case having an opening emerging on the passage, the strip being gripped between the framework and a peripheral rim of the case.

The invention also relates to a motor vehicle comprising an interior trim assembly as defined above.

BRIEF DESCRIPTION OF THE DRAWINGS

The invention and its advantages will be better understood upon reading the following description, provided only as an example and done in reference to the appended drawings, in which.

DETAILED DESCRIPTION OF THE EMBODIMENTS

Figure 1:
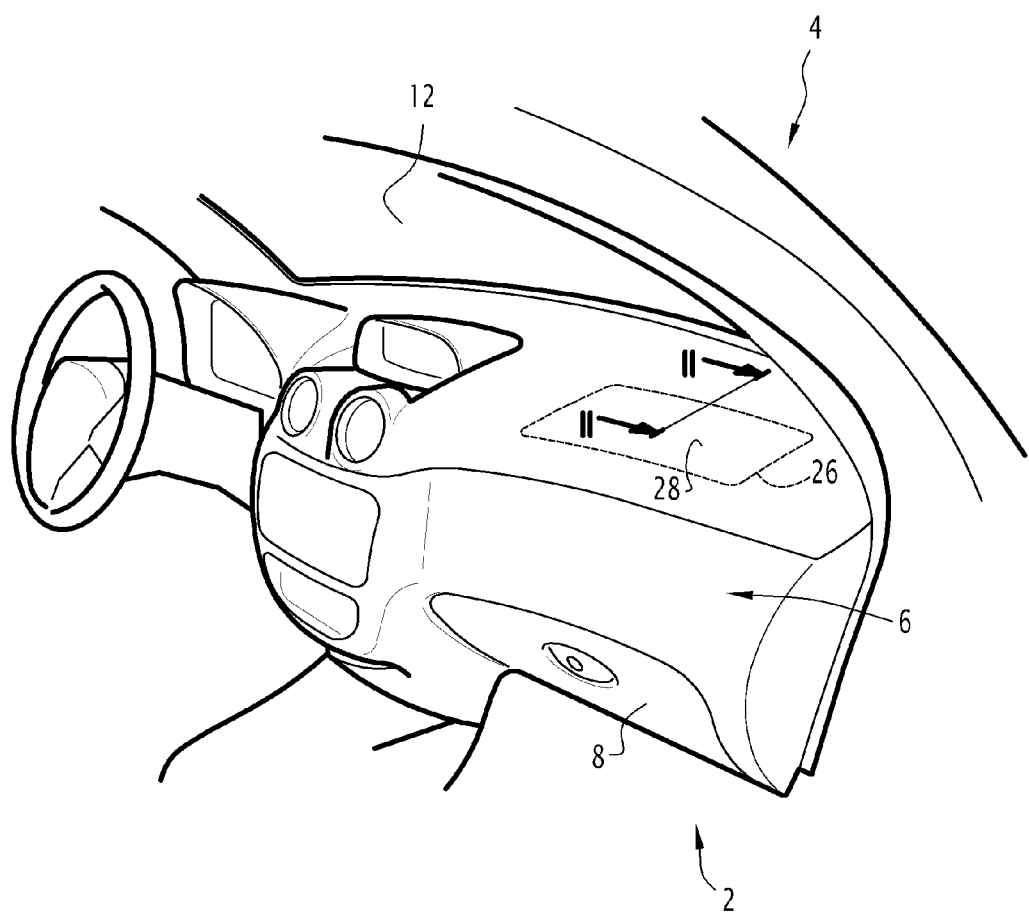
FIG. 1 is a partial diagrammatic perspective view of a motor vehicle comprising a dashboard covered with a trim assembly according to the invention.

As shown in FIG. 1, the dashboard 2 of a motor vehicle 4 is covered, on the passenger side (on the right in FIG. 1), with an interior trim assembly 6 extending between a glove compartment door 8 and the base of the windshield 12.

Figure 2:
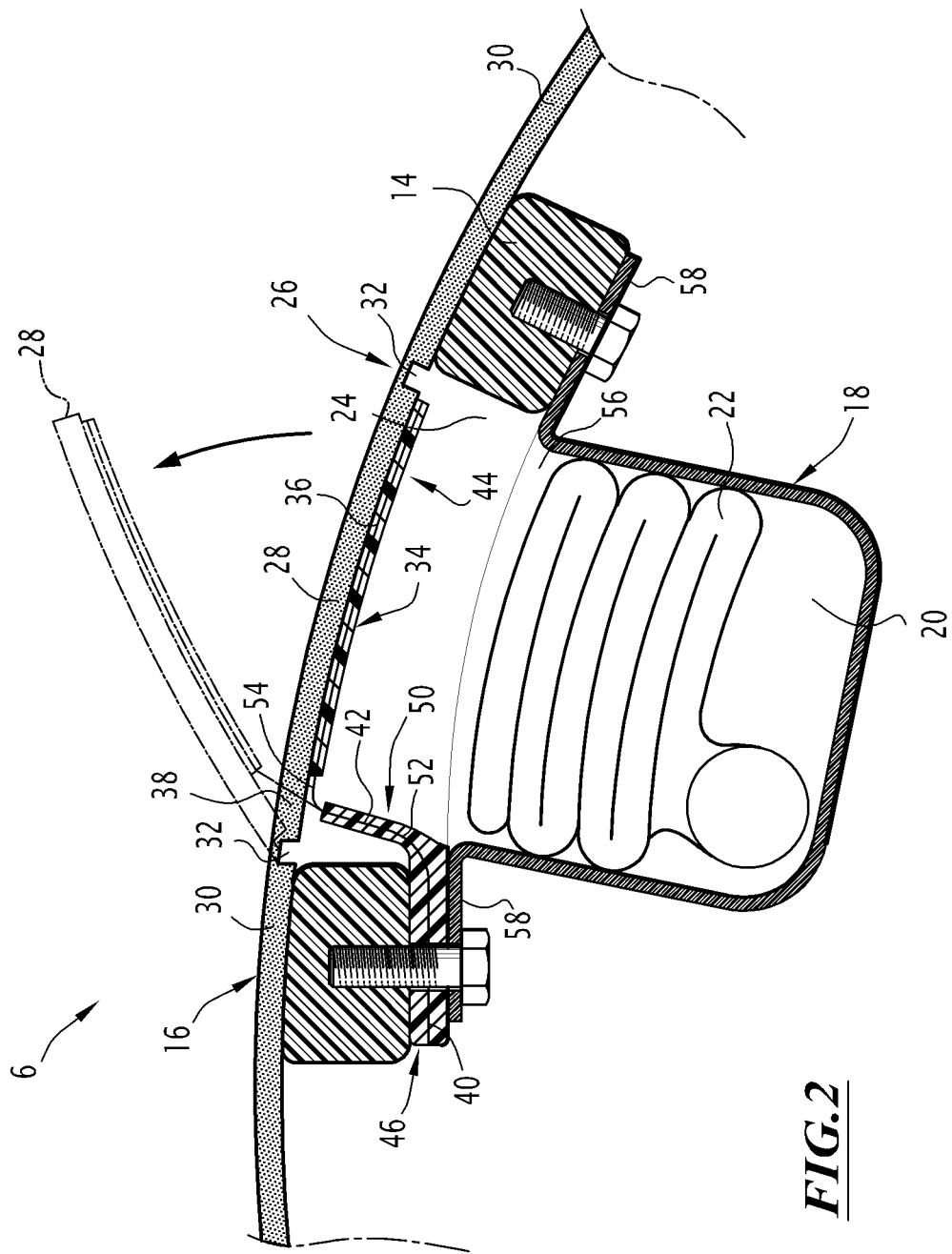
FIG. 2 is a diagrammatic cross-sectional view along II-II of the trim assembly.

As shown in FIG. 2, the assembly 6 comprises a support framework 14, a trim panel 16 attached on the framework 14, and a case 18 delimiting a housing 20 for receiving a folded airbag 22.

In a known manner, the airbag 22 is provided to be quickly inflated in the event the vehicle undergoes a collision, for example using a gas generator triggered by a control unit associated with a collision detector, such as an accelerometer.

The framework 14 assumes the form of an annular frame and delimits a passage 24 for the airbag 22 during deployment thereof.

The panel 16 covers the framework 14 and constitutes the visible portion of the assembly 6. The panel 16 comprises a breaking line 26 with a closed contour delimiting a flap 28 and a peripheral region 30 surrounding the flap 28.

The framework 14 is attached against the inner surface of the panel 16, i.e. the non-visible surface facing the inside of the assembly 6, for example by vibration welding, as will be described in more detail below.

The breaking line 26 of the panel 16 is for example a thinner line of the panel 16 obtained by forming a groove 32 on the inner surface of the panel 16.

The breaking line 26 substantially follows the contour of the passage 24. Thus, the flap 28 is situated opposite the passage 24.

The breaking line 26 is intended to break in the event force is applied on the inner surface of the flap 28 to allow the flap 28 to move relative to the rest of the panel 16, and to thereby free the passage 24 to allow the airbag 22 to deploy towards the outside.

The assembly 6 comprises a hinge-forming strip 34 connecting the flap 28 to the framework 14, and intended to retain the flap 28 during movement thereof.

The strip 34 comprises a flap portion 36 attached on the flap 28, a framework portion 40 attached on the framework 14, and a hinge portion 42 extending between the flap portion 36 and the framework portion 40. The framework portion 40 extends along a hinge edge 38 of the flap 28.

The strip 34 assumes the form of a strip of supple or flexible material, such as a textile material. The strip 34 is preferably a knit strip or a net.

After breaking of the breaking line 26, the flexible strip 34 allows the flap 28 to pivot relative to the panel 16 towards the outside by deformation of the hinge portion 42. The flap 28 pivots around its hinge edge 38, as illustrated in broken lines in FIG. 2.

The strip 34 is overmolded by reinforcing elements 44, 46 for reinforcement and fastening thereof on the framework 14 and the flap 28, respectively.

The assembly 6 comprises a first reinforcing element 44 overmolded on the flap portion 36 of the strip 34. This reinforcing element 44 is itself fastened on the flap 28, for example by welding the reinforcing element 44 against the inner surface of the flap 28, in particular by vibration welding, as will be described in more detail below.

The assembly 6 comprises a second reinforcing element 46 overmolded on the framework portion 40. This reinforcing element 46 is itself fastened on the framework 14 on the side opposite the panel 16, for example by screwing or spot welding, as will be described in more detail below.

Figure 3:
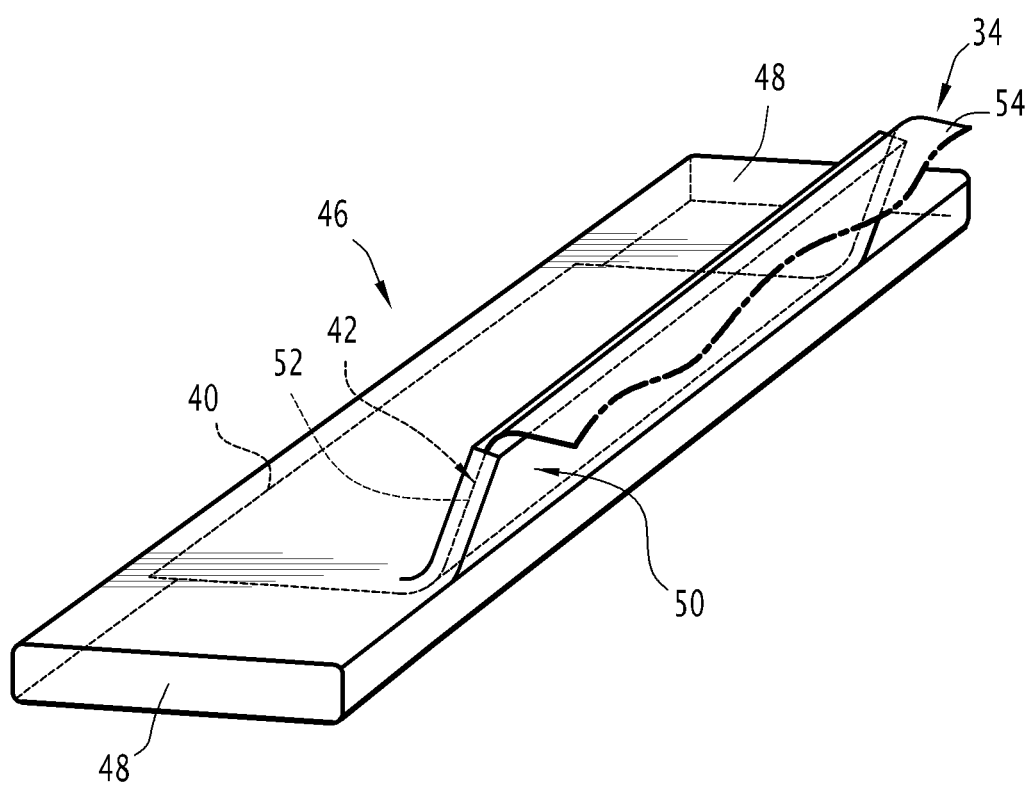
FIG. 3 is a diagrammatic perspective view of a reinforcing element of the trim assembly.

As shown in FIG. 3, the second reinforcing element 46 assumes the form of a substantially rectangular plate wider than the strip 34. The second reinforcing element 46 has lateral wings 48 extending laterally beyond the strip 34.

As illustrated in FIGS. 2 and 3, the assembly comprises a protective element 50 overmolded on the hinge portion 42 and covering it only partially. The protective element 48 covers the region 52 of the hinge portion 42 adjacent to the framework portion 14. The region 54 of the hinge portion 42 adjacent to the flap portion 36 is exposed.

The exposed region 54 extends between the covered region 52 and the flap portion 36. The covered region 52 extends over the majority of the length of the hinge portion 42 between the framework portion 40 and the flap portion 36.

The protective element 50 is integral with the second reinforcing element 46. The protective element 50 assumes the form of a lip protruding from an edge of the second reinforcing element 46, forming, in its free state, an angle with the latter. The incline angle between the reinforcing element 46 and the protective element 50 is preferably between 0° and 90°.

The protective element 50 and the covered region 52 extend substantially rectilinearly from the framework portion 40 and the reinforcing element 46, towards the edge 38 of the flap 28.

The exposed region 54 connects the covered region 52 and the flap portion 36 while being folded due to the relative incline between the covered region 52 and the flap portion 36.

Returning to FIG. 2, the framework portion 40 and the second reinforcing element 46 are fastened on the face of the framework 14 opposite the panel 16, on the edge 38 side of the flap 28.

To that end, on one hand, the second reinforcing element 46 is screwed or vibration welded on the framework 14. On the other hand, the case 18 comprises an opening 56 through which the housing 20 emerges in the passage 24. The opening 56 has substantially the same section as the passage 24. The case 18 comprises a peripheral rim 58 surrounding the opening 54, and through which the case 18 is fastened on the framework 14, using screws or hooks. The framework portion 40 and the second reinforcing element 46 are gripped between the rim 58 and the framework 14. They are passed through by fastening screws for fastening the rim 58 on the framework 14. The screws pass through the reinforcing element 46 at the strip 34 and through the wings 48.

The operation of the assembly will now be described.

The airbag 22 is initially folded inside the housing 20. In the event a collision undergone by the motor vehicle is detected, the airbag 22 is inflated and deploys through the passage 24 while pushing the flap 28.

The breaking line 26 breaks, which allows the flap 28 to move to free the passage 24 and allow the airbag 22 to deploy outwardly, to protect an occupant.

The protective element 50 overmolded on the hinge portion 42 protects the latter when the airbag 22 strikes it under the effect of its abrupt inflation and limits the force peak passing through the strip 42 in the exposed region 54. This limits the risks of tearing of the strip 34 and projecting the flap 28 into the passenger cab.

The protective element 50 has a certain rigidity, and because of its incline towards the flap 28 and the center of the passage 24, it makes it possible to divert the airbag 22 when it is deployed towards the edge of the flap 28 opposite the hinge edge 38. Thus, the tear line 26 begins to tear on the side of the flap 28 opposite the hinge edge 38. This prevents the strip 34 from being too substantially stressed and limits the risks of a tearing of the strip 34. This also favors the rotation of the flap 28 around its hinge edge 38, and limits the risks of breaking between the flap portion 36 and the flap 28 of the panel 16.

The protective element 50 only partially covering the hinge portion 42, and leaving an exposed region 54, facilitates the production of the assembly 6, and makes it possible to ensure better fastening of the strip 34 on the flap 28.

Indeed, one method of manufacturing the assembly 6 comprises a first step of overmolding the strip 34 using the reinforcing elements 44,46 and the protective element 50.

Figure 4:
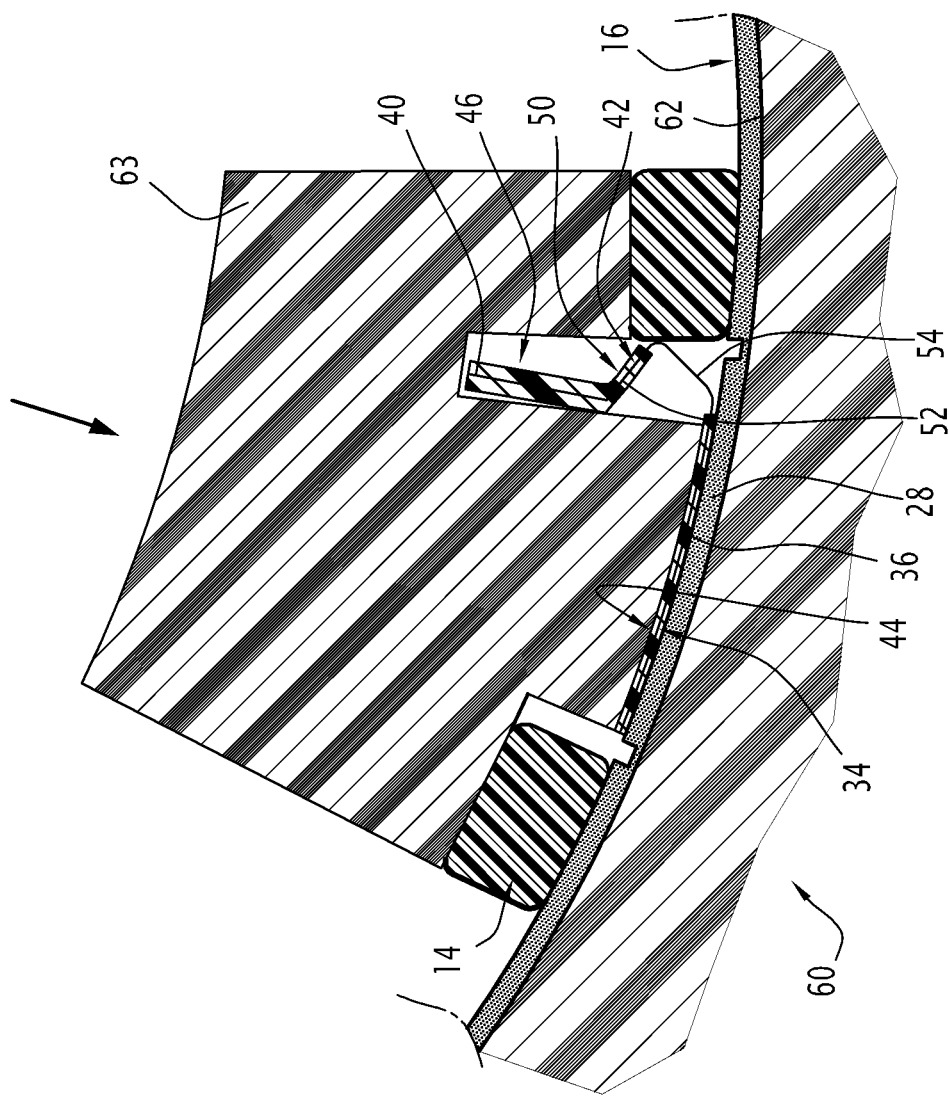
FIG. 4 is a view similar to that of FIG. 2 illustrating a method for manufacturing the trim assembly.

Then, as shown in FIG. 4, the method comprises a second step for vibration welding, in which:

the panel 16 is arranged bearing by its outer surface against a counter-bearing wall 62 of a vibration welding device 60, the framework 14 is arranged against the inner surface of the panel 16 (more specifically of the peripheral region 30, around the flap 28), the flap portion 36 is arranged against the flap 28 by folding the exposed region 54 so as to fold down the framework portion 40 substantially perpendicular to the panel 16, and a vibration welding tool 63 is applied against the framework 14 and against the reinforcing element 44, on the side opposite the panel 16, so as to simultaneously vibration weld the framework 14 on the peripheral region 30 and the reinforcing element 44 on the flap 28.

The tool 63 is provided with a cavity C for receiving the reinforcing element 46 and the protective element 50 in the folded down position (FIG. 4).

Then, the framework portion 40 and the reinforcing element 46 will be fastened on the framework 16, during fastening of the case 18 (FIG. 2) on the framework 14. Optionally, the reinforcing element 46 is vibration welded on the framework 14 before fastening the case 18 on the framework 14.

During the vibration welding, the vibrations cause heating and welding of the reinforcing element 44 and the framework 14 against the flap 28 and the panel 16, respectively.

The exposed region 54 makes it possible to fold the strip 34 with a small radius of curvature, in the restricted residual space between the tool M, the panel 16, and the framework 14, to fold the strip 34, the reinforcing element 44, and the protective element 50 in a configuration with minimum bulk allowing the passage of the tool 63, so as to weld the reinforcing element 44 on a substantial surface area of the flap 28. This improves the connection between the strip 34 and the flap 28 and decreases the risks of ejection of the flap 28.

The exposed region 54 is more flexible than the covered region 52. It can easily be folded with a small length and a small radius of curvature.

In the final configuration, this makes it possible to compensate the angle between the covered region 52 and the flap portion 36 over a small strip length 34. It is thus possible to provide a wide-reaching protective element 50, extending up to near the flap portion 36, over the majority of the length of the hinge portion 42. The hinge portion 42 is thus effectively protected, and allows the flap 28 to pivot when the airbag 22 is deployed, in particular owing to its flexible exposed region 54.

Figure 5:
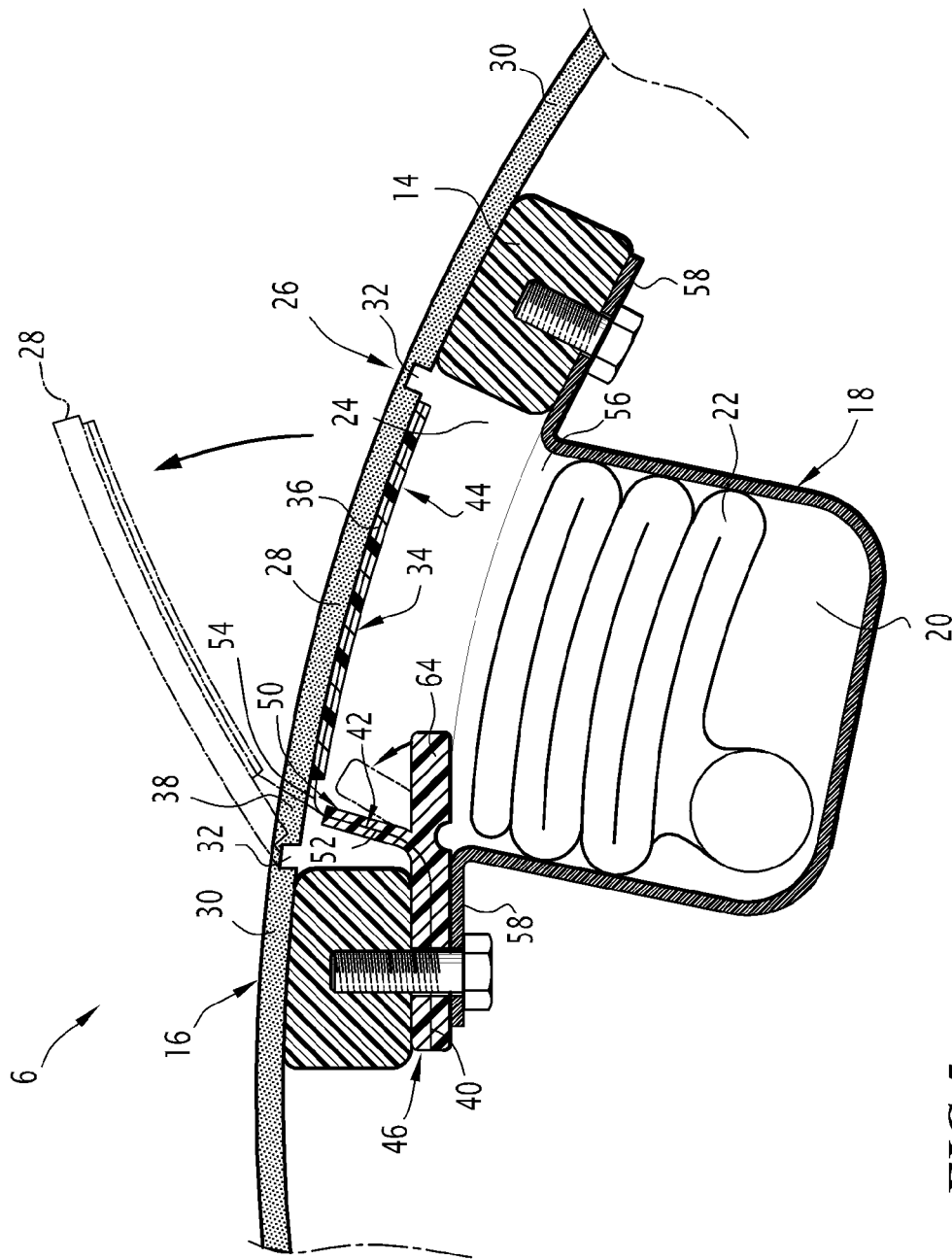
FIGS. 5 and 6 are views similar to those of FIGS. 2 and 3, illustrating a trim assembly according to a second embodiment.
Figure 6:
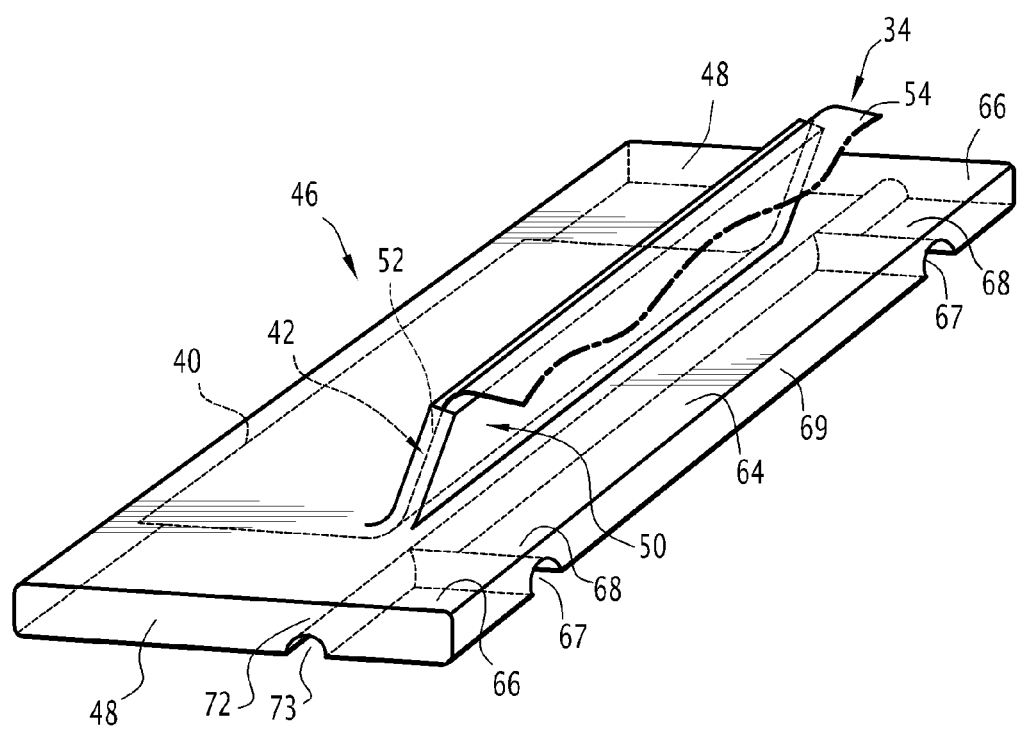

The embodiment of FIGS. 5 and 6 differs from that of FIGS. 2 and 3, from which the same reference numbers are used, in that the assembly 6 also comprises a deflector 64 integral with the second reinforcing element 46 and the protective element 50.

The deflector 64 extends the second reinforcing element 46 towards the center of the passage 24, so as to partially obstruct the passage 24 upstream of the strip 34 in the direction of movement of the airbag 22 through the passage 24 during deployment thereof, on the side of the hinge edge 38 of the flap 28.

The second reinforcing element 46 comprises two lateral extensions 66 (FIG. 6) extending from each side of the deflector 64 and separated therefrom by tear zones 68, for example defined by thinner zones obtained by forming grooves. The breaking zones 68 extend from the free edge 69 of the deflector 64, substantially perpendicular thereto.

The deflector 64 and the second reinforcing element 46 are connected by a film-hinge 72 extending parallel to the free edge 69 of the deflector 64. The film-hinge 72 is provided in the form of a portion with a smaller thickness obtained by forming a groove 73.

The lateral extensions 66 are fastened on the framework 14, for example being welded and/or screwed on the framework 14.

The deflector 64 protrudes through the passage 24 while moving away from the protective element 50 and the strip 34. The protective element 50 forms an angle of about 45° with the deflector 64.

When the airbag 22 deploys, the deflector 64 diverts the airbag 22 towards the edge of the flap 28 opposite its hinge edge 38 in an improved manner relative to the preceding embodiment, and while protecting the protective element 50 from a direct collision with the airbag 22.

During the deployment of the airbag 22, the breaking zones 68 of the reinforcing element 44 tear and the deflector 64 folds down against the protective element 50 while pivoting around the film-hinge 72.

In this way, the deflector 64 initially obstructs the passage 24 to divert the airbag 22, then falls back to better free the passage 24 and allow better and faster deployment of the airbag 22.

The lateral extensions 66 make it possible to retain the deflector 64 in the initial phase of the deployment of the airbag 22 to ensure effective diversion thereof.

The protective element 50 protects the hinge portion 42 from collision with the deflector 64, and indirectly with the airbag 22.

The deflector 64 is obtained simply and inexpensively by making the reinforcing element 46, the protective element 50, and the deflector 64 in a single piece obtained by overmolding plastic material on the strip 34.

The deflector 64 has been shown with a substantial length for the clarity of the drawings. In practice, the deflector 64 has a smaller length, sufficient to divert the airbag 22 while also allowing the insertion of the assembly formed by the reinforcing element 46, the protective element 50 and the deflector 64 in the cavity C of the vibration welding tool 63 (FIG. 4) for welding of the reinforcing element 44 of the flap portion 36 on a large surface of the flap 28.

If the protection provided by the deflector 64 is sufficient to ensure the integrity of the strip 34, and in particular of the hinge portion 42, during deployment of the airbag 22, it is possible to provide an assembly not having a protective element 50.

Thus, generally, the invention also relates to an interior trim assembly for a motor vehicle, of the type comprising a framework and a panel for concealing an airbag, comprising a flap and a region surrounding the flap, the flap being intended to move during the deployment of the airbag to free a passage for deployment of the airbag, a hinge-forming strip between the flap and the peripheral region along a hinge edge of the flap, the strip having a flap portion attached to the flap and a framework portion attached to the framework, and a deflector arranged to partially obstruct the passage along the hinge edge upstream of the strip in the direction of movement of the airbag, and a reinforcing element of the framework portion of the strip, the deflector being integral with the reinforcing element.

The invention is applicable to trim assemblies for motor vehicle dashboards, and also interior door panels, and more generally trim assemblies of any element of a motor vehicle.

What is claimed is:

1. An interior trim assembly for a motor vehicle comprising a framework and a panel for concealing an airbag, the panel being fastened on the framework and comprising a flap covering an airbag deployment passage delimited by the framework and a peripheral region surrounding the flap and attached to the framework, the flap being configured to move during the deployment of the airbag to free the airbag deployment passage, the panel comprising a hinge-forming strip comprising a flap portion attached to the flap, a framework portion attached to the framework, and a hinge portion extending between the flap portion and the framework portion, wherein a region of the hinge portion adjacent to the framework portion is covered by a protecting element and wherein a region of the hinge portion adjacent to the flap region is exposed and is not covered by the protecting element.

2. The assembly according to claim 1, wherein the covered region represents the majority of the hinge portion length between the flap portion and the framework portion.

3. The assembly according to claim 1, comprising a reinforcing element overmolded on the flap portion.

4. The assembly according to claim 3, wherein the flap portion is attached on the flap by welding of the reinforcing element covering the flap portion.

5. The assembly according to claim 1 further comprising a reinforcing element overmolded on the framework portion.

6. The assembly according to claim 5, wherein the protecting element is overmolded on the hinge portion while being integral with the reinforcing element covering the framework portion.

7. The assembly according to claim 6, wherein the reinforcing element covering the framework portion is generally in plate form, and the protective element is in the form of a lip protruding from one edge of the reinforcing element covering the framework portion, the lip forming an angle with the reinforcing element covering the framework portion.

8. The assembly according to claim 5 further comprising a deflector arranged to partially obstruct a passage upstream of the hinge-forming strip in the direction of deployment of the airbag, the deflector being integral with the reinforcing element covering the framework portion.

9. The assembly according to claim 8, wherein the deflector is provided to fold down against the intermediate portion of the hinge-forming strip.

10. The assembly according to claim 9, wherein the deflector comprises a central portion extending through the airbag deployment passage and two lateral extensions attached on the framework and separated from the central portion by at least one breaking line configured to break so the central portion folds down against the intermediate portion.

11. The assembly according to claim 1, wherein the hinge-forming strip is a knit strip or a net.

12. The assembly according to any one of the preceding claims, wherein the panel comprises a breaking line delimiting the flap, and configured to tear to allow the flap to move relative to the peripheral region in order to free the airbag deployment passage.

13. The assembly according to claim 1 further comprising a case receiving the folded airbag, the case being attached on the framework on the side opposite the panel, the case comprising an opening emerging on the airbag deployment passage, the hinge-forming strip being gripped between the framework and a peripheral rim of the case.

14. A motor vehicle comprising an interior trim assembly according to claim 1.

15. The assembly according to claim 5, wherein the protecting element forms an angle with the reinforcing element comprised between 0° and 90°.

* * * * *

UNITED STATES PATENT AND TRADEMARK OFFICE
CERTIFICATE OF CORRECTION

PATENT NO. : 8,424,905 B2
APPLICATION NO. : 13/122551
DATED : April 23, 2013
INVENTOR(S) : Michael Brunet It is certified that error appears in the above-identified patent and that said Letters Patent is hereby corrected as shown below:

In the Claims:

At column 7, lines 3-4, in claim 1, please delete "flap region" and insert therefore --flap portion--

Signed and Sealed this
Twenty-first Day of May, 2013

Teresa Stanek Rea
*Acting Director of the United States Patent and Trademark Office*